(12) United States Patent
Salow

(10) Patent No.: US 7,314,254 B1
(45) Date of Patent: Jan. 1, 2008

(54) DECORATIVE WHEEL APPARATUS

(76) Inventor: Chris Salow, 4624 Parman, Stockbridge, MI (US) 49285

( * ) Notice: Subject to any disclaimer, the term of this patent is extended or adjusted under 35 U.S.C. 154(b) by 335 days.

(21) Appl. No.: 11/050,630

(22) Filed: Feb. 4, 2005

Related U.S. Application Data

(60) Provisional application No. 60/642,511, filed on Jan. 10, 2005.

(51) Int. Cl.
*B60B 7/04* (2006.01)

(52) U.S. Cl. .................. 301/37.25; 301/37.108

(58) Field of Classification Search .......... 301/37.25, 301/37.101, 37.108, 37.109; 40/587; 362/500; 359/522, 523, 524
See application file for complete search history.

(56) References Cited

U.S. PATENT DOCUMENTS

| 574,277 | A | | 12/1896 | Scott |
|---|---|---|---|---|
| 790,960 | A | | 5/1905 | Hodgson |
| 2,083,806 | A | | 6/1937 | Anderson |
| 3,155,430 | A | | 11/1964 | Schindler |
| 4,121,851 | A | * | 10/1978 | Finkenbiner ............ 280/288.4 |
| 4,741,598 | A | | 5/1988 | Goedert |
| 5,287,221 | A | | 2/1994 | Sun |
| 6,443,530 | B1 | | 9/2002 | Lee |
| 6,637,830 | B1 | | 10/2003 | Burgess |
| 6,899,400 | B1 | * | 5/2005 | Cook ....................... 301/37.25 |
| 7,032,979 | B2 | * | 4/2006 | Kornijenko .............. 301/37.25 |
| 2006/0061208 | A1 | * | 3/2006 | Fultz et al. .............. 301/37.25 |
| 2006/0125310 | A1 | * | 6/2006 | Miansian et al. ........ 301/37.25 |

* cited by examiner

*Primary Examiner*—Russell D. Stormer
(74) *Attorney, Agent, or Firm*—Young Basile

(57) ABSTRACT

A decorative wheel apparatus for enhancing the aesthetic appearance of a rotatable wheel having an axle with a rotational axis. The decorative wheel apparatus provides a friction drive engageable with and driven by the axle of the wheel about the rotational axis. A shaft is supportable by the wheel and rotatably driven by the friction drive. At least one decorative figure is coupled to the shaft for rotation of the at least one decorative figure for enhancing the aesthetic appearance of the wheel.

20 Claims, 4 Drawing Sheets

DECORATIVE WHEEL APPARATUS

The subject application is a formalization of U.S. Provisional Patent Application Ser. No. 60/642,511 filed on Jan. 10, 2005.

FIELD OF THE INVENTION

The present invention relates to a decorative wheel apparatus, and in particular, a decorative wheel apparatus having at least one decorative figure that rotates in response to the rotation of a wheel of a vehicle.

BACKGROUND OF THE INVENTION

Large on-road motorcycles have always been popular with a particular segment of the public. Such popularity has lead to the design and marketing of many after-market devices which can be placed or mounted on the motorcycle to enhance its aesthetic appearance. In a like fashion, many after-market products have also been designed and marketed for enhancing the aesthetic appearance of automobiles.

The design and marketing of products to enhance the aesthetic appearance of the wheels of motorcycles and automobiles have been limited. For instance, various shapes of wheels have been made of various materials, such as chrome, steel, and aluminum. In addition, wheels of motorcycles and automobiles have been spoked and solid, as well as other various geometric configurations. However, neither original equipment makers (OEMs) nor after-market suppliers of motorcycles and automobiles have created wheels which provide moving parts that add to the aesthetic appearance of the vehicle.

It would be desirable to provide a wheel assembly that provided moving parts to enhance the aesthetic appearance of a vehicle. It would also be desirable to provide a wheel assembly that provided decorative figures that rotate in response to the rotation of the wheel.

SUMMARY OF THE INVENTION

The present invention relates to a decorative wheel apparatus for enhancing the aesthetic appearance of a wheel having an axle with a rotational axis. The present invention provides a friction drive engageable with and driven by the axle of the wheel about the rotational axis of the axle. A shaft is supportable by the wheel and rotatably driven by the friction drive. At least one decorative figure is coupled to the shaft, wherein the shaft rotates the at least one decorative figure to enhance the aesthetic appearance of the wheel.

The friction drive may include a floating spring adaptable to rotate with the axle about the rotational axis of the axle. A substantially cylindrical plate is coupled to and spring biased by the floating spring. An O-ring is disposed within a recess in the cylindrical plate and is biased against the shaft for engaging and rotating the shaft. A spool is connected to the shaft, and the O-ring engages and rotates the spool and the shaft about a rotational axis substantially perpendicular to the rotational axis of the axle.

In one embodiment, the at least one decorative figure is a substantially circular disc having a rotational axis substantially perpendicular to the rotational axis of the axle. In another embodiment, the at least one decorative figure is a substantially circular disc having a rotational axis substantially parallel to the rotational axis of the axle.

BRIEF DESCRIPTION OF THE DRAWINGS

The description herein makes reference to the accompanying drawings wherein like reference numerals refer to like parts throughout several views, and wherein.

DESCRIPTION OF THE PREFERRED EMBODIMENT

Figure 1:
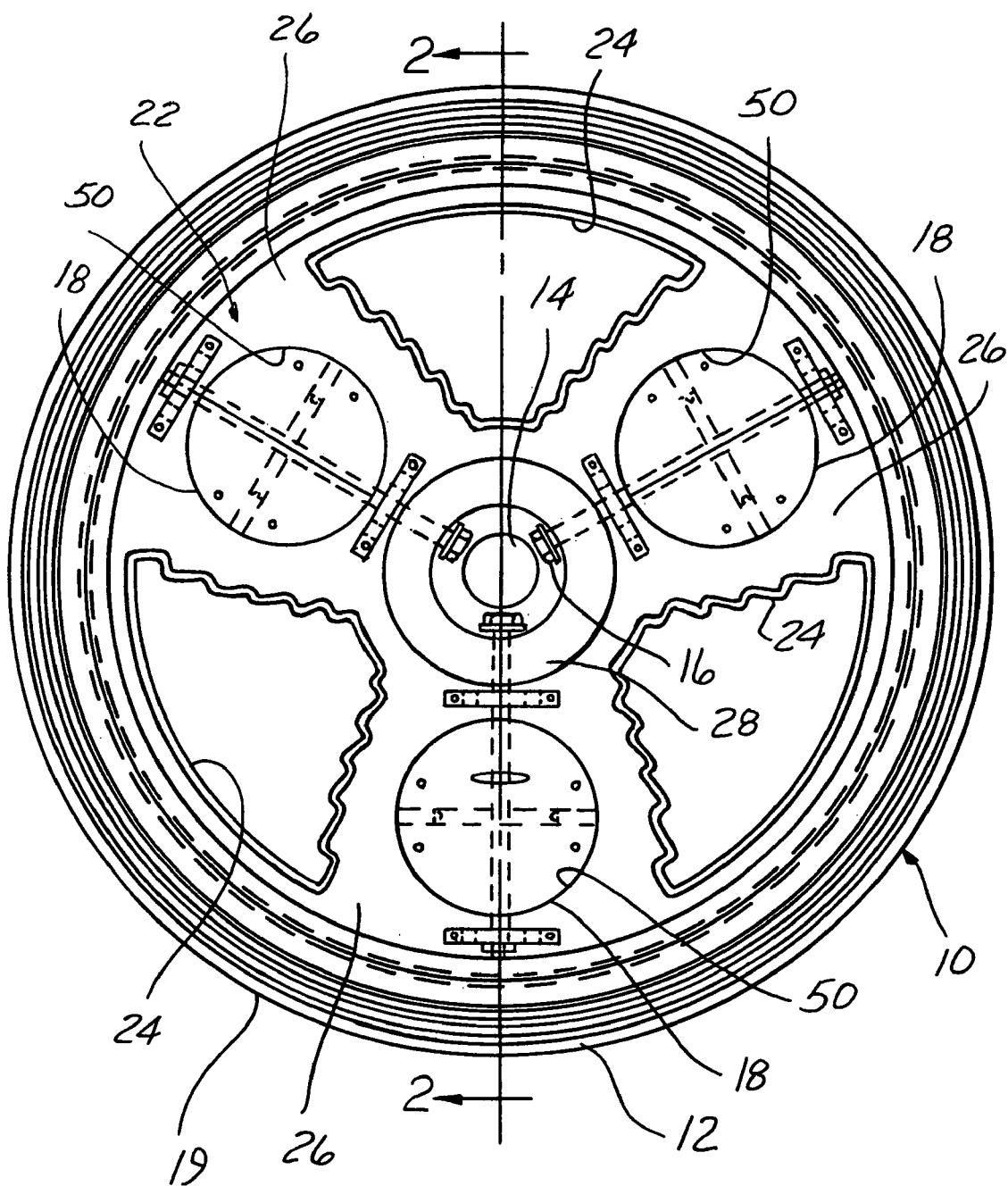
FIG. 1 is a front plan view of the first embodiment of the decorative wheel apparatus of the present invention.

Referring to the drawings, the present invention will now be described in detail with reference to the disclosed embodiments.

Figure 2:
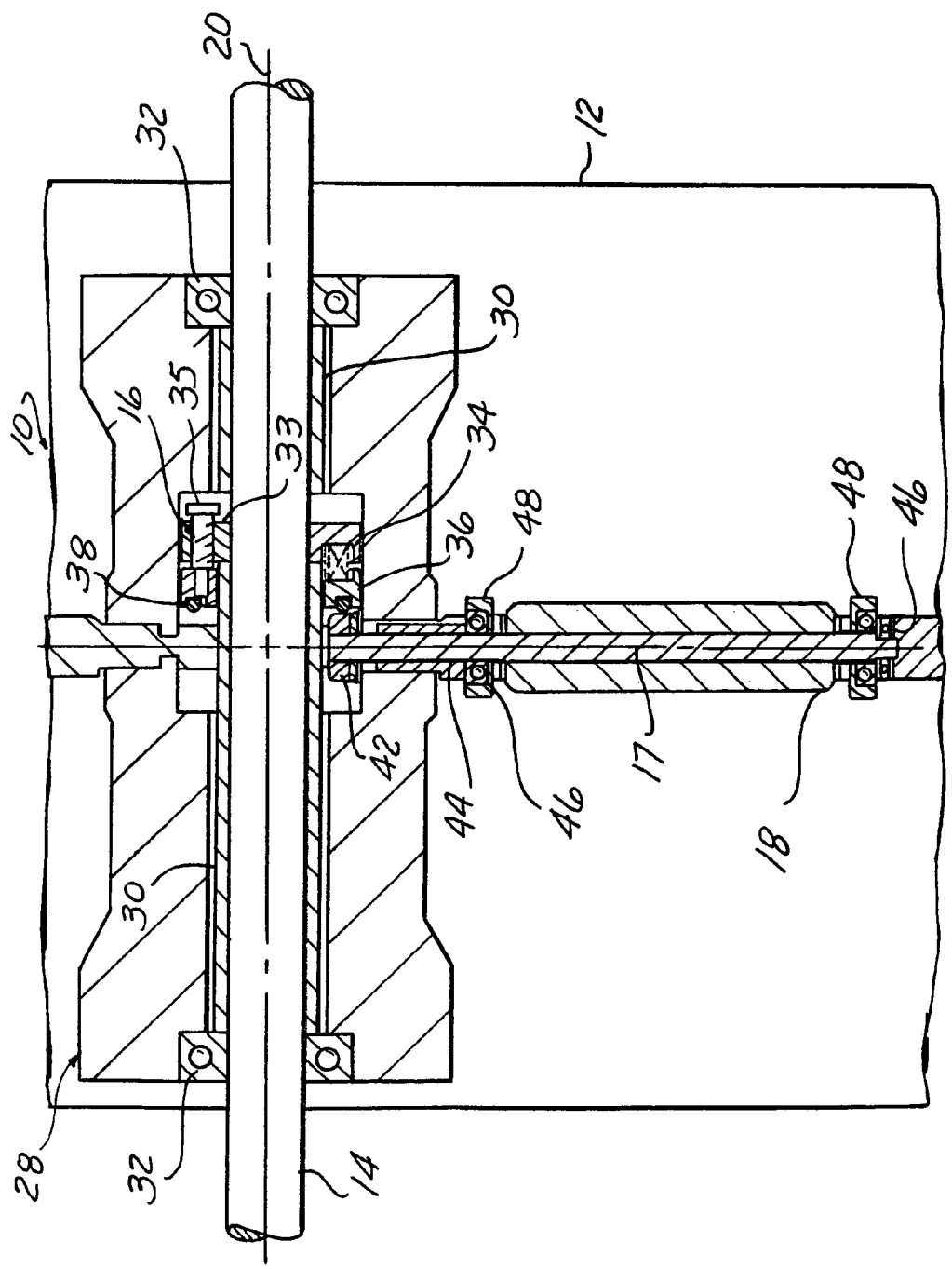
FIG. 2 is a sectional view shown in the direction of arrows 2-2 in FIG. 1 of the decorative wheel apparatus of the present invention.
Figure 3:
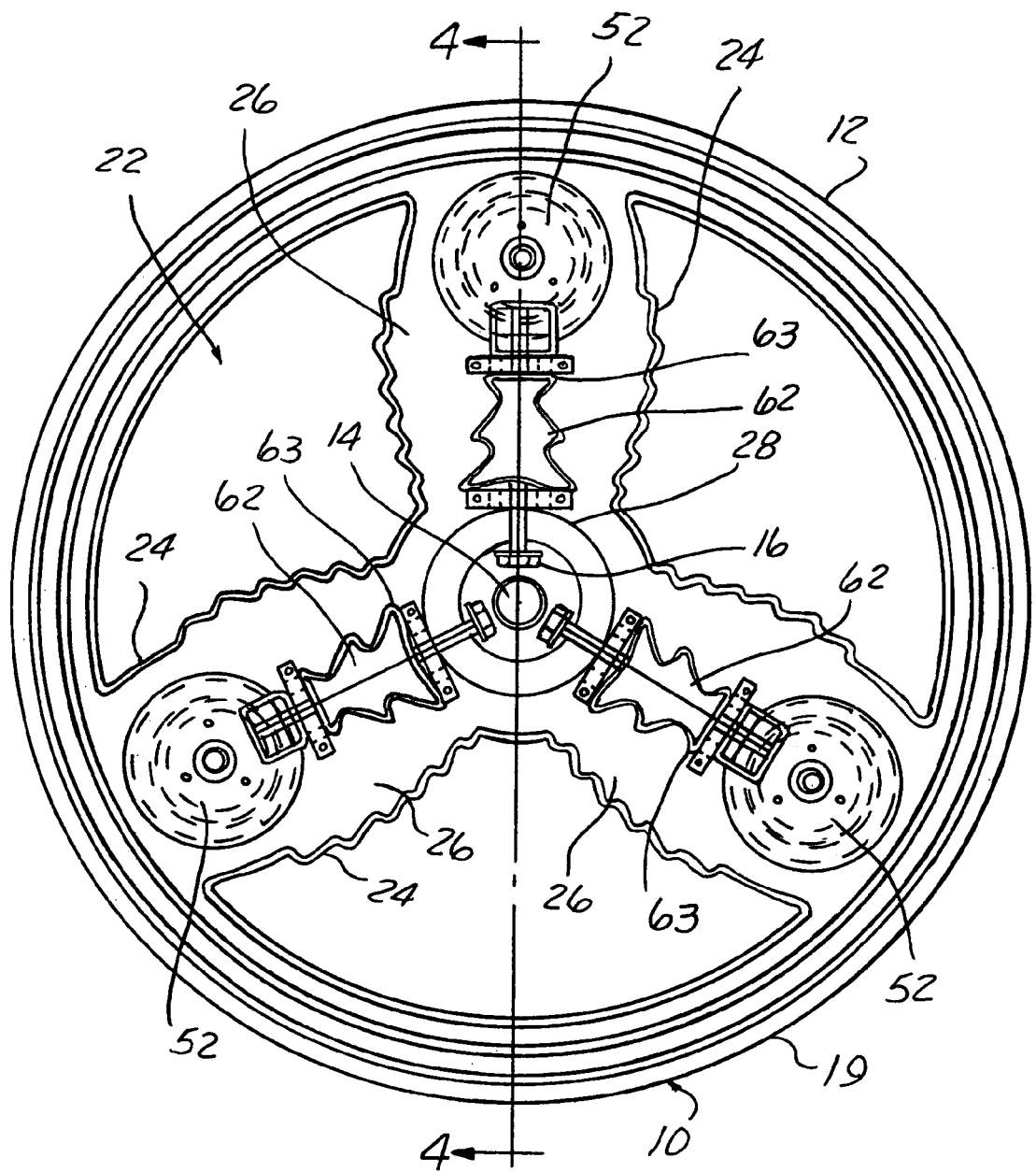
FIG. 3 is a front plan view of the second embodiment of the decorative wheel apparatus of the present invention.

FIGS. 1-4 illustrate a decorative wheel apparatus 10 of the present invention. The decorative wheel apparatus 10 is shown being utilized on a wheel 12 of a vehicle (not shown). Although the decorative wheel apparatus 10 is ideally suited for use on the wheel 12 of a motorcycle (not shown), the invention is not limited to being used on a wheel 12 of a motorcycle, but rather, the decorative wheel apparatus 10 of the present invention may be utilized on other desirable wheels, such as those utilized on an automobile or other wheeled vehicles. The wheel 12 typically has a conventional tire (not shown) mounted on an outer circumference of the wheel 12. The wheel 12 is rotatably driven by an axle 14 which may be power driven by a motor and/or a drive shaft of the vehicle or may be manually driven through the use of a manually powered wheeled vehicle (not shown). The axle 14 is connected to a friction drive 16 which rotates a plurality of decorative figures 18, 52, 62 mounted within the circumference of the wheel 12. The decorative figures 18, 52, 62 may include a substantially circular, plate-like disc 18, as seen in FIGS. 1 and 2, or a pine tree shape figure 62, as seen in FIG. 3. The present invention is not limited to the above-noted shapes for the decorative figures 18, 52, 62, but rather, the present invention anticipates any design that will enhance the appearance of the wheel 12. The rotation of the decorative figures 18, 52, 62 in conjunction with the rotation of the wheel 12 provides an appearance that enhances the aesthetic appearance of not only the wheel 12, but also the vehicle.

The wheel 12 of the vehicle provides features which support the decorative wheel apparatus 10 of the present invention, as seen in FIGS. 1-4. The wheel 12 is substantially circular and has a conventional outer circumferential wheel design for supporting the mounting of the tire. The wheel 12 is coaxially mounted to the axle 14 about a rotational axis 20 of the axle 14. An inner circumference 22 of the wheel 12 provides three cut-out portions 24 for enhancing the aesthetic appearance of the wheel 12. Three spoked portions 26 are formed between the three cut-out portions 24 of the wheel 12. The three spoked portions 26 extend radially between the outer circumference 19 of the wheel 12 and the axle 14. The wheel 12 may be fabricated of various materials, such as chrome, aluminum, stainless steel, or any other metallic or high-strength material that would serve as a proper material for the wheel 12.

The wheel 12 is mounted to the axle 14 of the vehicle through the use of a hub 28. The hub 28 is substantially cylindrical and is coaxially mounted on the axle 14 such that the hub 28 receives the axle 14 coaxially along the rotational axis 20. A bearing spacer 30 is mounted between the friction drive 16 and a bearing 32 mounted in the hub 28 of the wheel 12. The bearing 32 aids in the rotation of the wheel 12 relative to the axle 14.

In order to rotate the decorative figures 18, 52, 62 of the decorative wheel apparatus 10, the friction drive 16 is mounted within a recess formed within the hub 28 of the wheel 12. The friction drive 16 provides a housing 33 that is connected to and rotates with the hub 28 of the wheel 12. A floating spring 34 is partially disposed within the housing 33 and a substantially cylindrical plate 36 mounted adjacent the housing 33. A fastener 35 connects the housing 33 to the cylindrical plate 36, but allows the cylindrical plate 36 to slide along the bearing spacer 30. The floating spring 34 biases the cylindrical plate 36 to slide along the bearing spacer 30 toward the center of the wheel 12. An O-ring 38 is partially disposed within a substantially cylindrical recess provided in the cylindrical plate 36. The floating spring 34 biases the cylindrical plate 36 against a substantially cylindrical spool 42 such that the O-ring 38 engages the cylindrical spool 42. The spool 42 is connected to a radially extending shaft 44 which may be connected to one or more of the decorative figures 18, 52, 62. The spool 42 and the shaft 44 are coaxially mounted about a rotational axis 17 that is substantially perpendicular to the rotational axis 20 of the axle 14 and the cylindrical plate 36.

To support rotation of the decorative disc 18, the decorative disc 18, in a first embodiment, is coaxially mounted to the shaft 44 about the rotational axis 17, as seen in FIGS. 1-2. A bearing 46 on each side of the decorative disc 18 is coupled to the shaft 44 to support rotation of the shaft 44 about the rotational axis 17. Each bearing 46 is housed within a bearing retainer 48 which in turn is connected to the wheel 12. The wheel 12 has a substantially circular cut-out portion 50 to allow the decorative disc 18 to rotate about the rotational axis 17 and through the wheel 12. The rotation of the decorative disc 18 in response to the rotation of the axle 14 enhances the aesthetic appearance of the wheel 12 and the vehicle.

We have described the structure associated with the rotation of one decorative disc 18, however, as seen in FIG. 1, the decorative wheel apparatus 10 of the present invention discloses the use of three decorative discs 18 in association with the wheel 12. Each decorative disc 18 has its own shaft 44 and spools 42, as noted above, but all of the decorative discs 18 share the same friction drive 16. However, the decorative wheel apparatus 10 of the present invention is not limited to three decorative discs 18, but rather, the decorative wheel apparatus 10 may comprise any number of decorative discs 18 utilized to enhance the aesthetic appearance of the wheel 12 and the vehicle.

Figure 4:
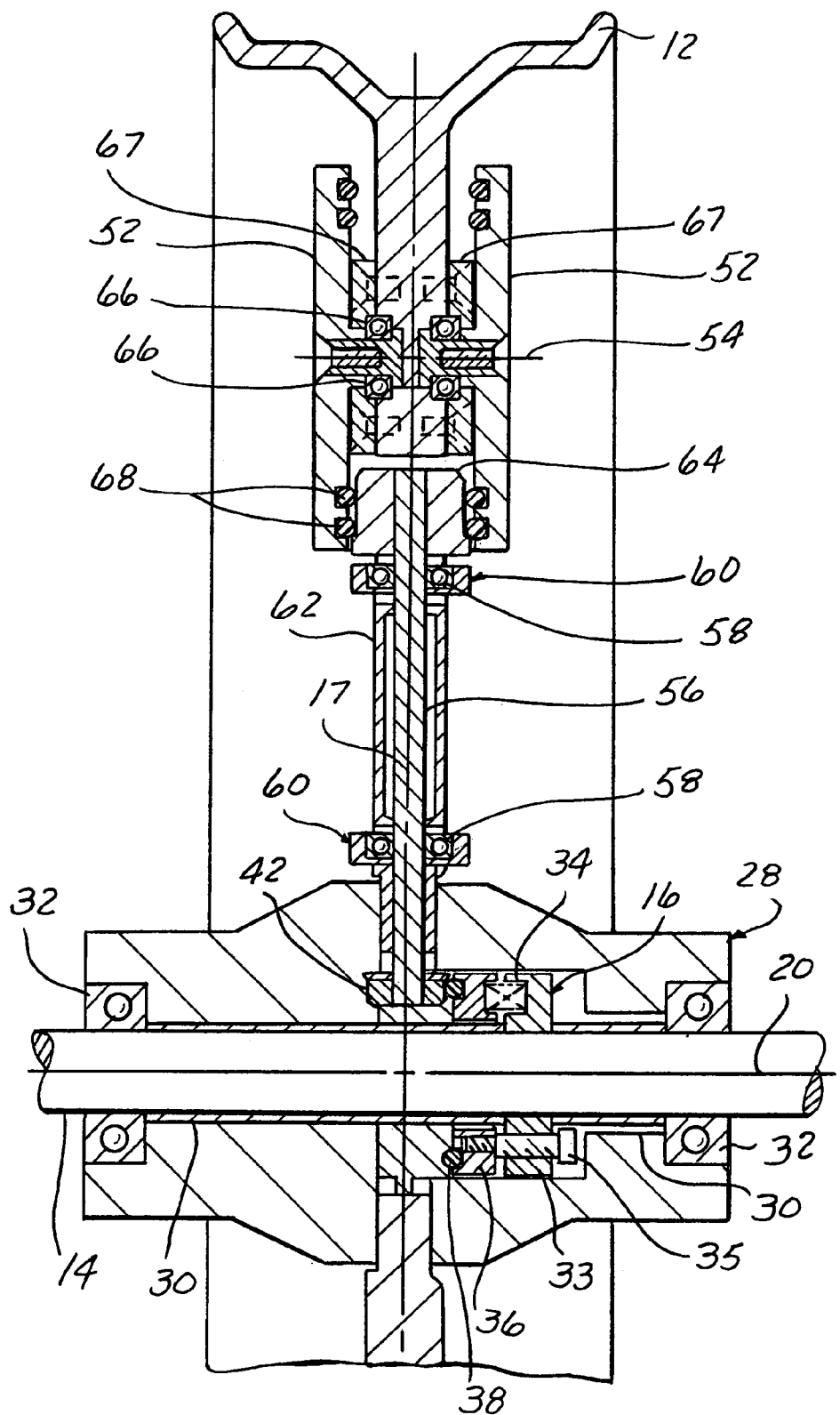
FIG. 4 is a sectional view shown in the direction of arrows 4-4 in FIG. 3 of the decorative wheel apparatus of the present invention.

In a second embodiment, two decorative discs 52 rotate about an axis 54 that is substantially parallel with the rotational axis 20 of the axle 14, as seen in FIGS. 3-4, as opposed to the decorative disc 18 rotating about the axis 17 substantially perpendicular to the rotational axis 20 of the axle 14, as described in the first embodiment. In order to rotate the two decorative discs 52, a second larger spool 64 is mounted on the radially extending end of a shaft 56, and the first smaller spool 42 is mounted on the opposite end of the shaft 56. The shaft 56 is rotatably supported by a pair of bearings 58 and bearing retainers 60 mounted to the wheel 12. The decorative discs 52 are rotationally mounted on each side of the wheel 12 such that the rotational axis 54 of the decorative discs 52 is substantially parallel to the rotational axis 20 of the axle 14. Each of the decorative discs 52 are rotatably supported by bearings 66 and a bearing retainer 67 which are connected to the wheel 12, and each of the decorative discs 52 have a pair of O-rings 68 partially disposed within recesses provided in the inner periphery of the decorative discs 52. The second spool 64 engages the O-rings 68 on the decorative discs 52 such that the rotation of the second spool 64 drives the decorative discs 52 about the rotational axis 54. The rotation of the decorative discs 52 enhances the aesthetic appearance of the wheel 12 and the vehicle. It should be noted that the present invention is not limited to two decorative discs 52, but rather, the present invention anticipates one or any number of decorative discs 52 in order to enhance the aesthetic appearance of the vehicle.

We have described the structure associated with the rotation of the pair of decorative discs 52, however, as seen in FIG. 3, the decorative wheel apparatus 10 of the present invention discloses the use of three pairs of decorative discs 52 in association with the wheel 12. Each pair of decorative discs 52 has its own shaft 56 and spools 42, 64, as noted above, but all of the decorative discs 52 share the same friction drive 16. However, the decorative wheel apparatus 10 of the present invention is not limited to three pairs of decorative discs 52, but rather, the decorative wheel apparatus 10 may include any number of pairs of decorative discs 52 utilized to enhance the aesthetic appearance of the vehicle.

To further enhance the aesthetic appearance of the wheel 12, the decorative figure 62 is mounted to the shaft 56 between the bearings 58 and the bearing retainers 60. The decorative figure 62 is shown having a general pine tree-shaped configuration. However, the present invention is not limited to the general pine tree-shaped configuration, but rather, any decorative configuration that is aesthetically pleasing upon the rotation thereof may be utilized. The decorative figure 62 is mounted on the shaft 56 such that the decorative figure 62 rotates with the shaft 56 about the rotational axis 17. The wheel 12 has a cut-out portion 63 corresponding to the shape of the decorative figure 62 such that the decorative figure 62 may rotate about the rotational axis 54 of the shaft 56 and through the wheel 12. The present invention is not limited to only one of the decorative figure 62 mounted to the shaft 56, but rather, the present invention anticipates that any number of decorative figure 62 may be mounted on the shaft 56. Although FIGS. 3-4 disclose the use of three decorative figure 62 on the wheel 12, the present invention is not limited to three of the decorative figure 62 being installed on the wheel 12, but rather, any number of decorative figure 62 may be installed on any number of shafts 56 mounted on the wheel 12.

In operation, the decorative wheel apparatus 10 is mounted to the wheel 12 of a vehicle, such as a motorcycle or other wheeled vehicle. As the vehicle advances, the axle 14 rotates thereby driving the friction drive 16. The housing 33 and the cylindrical plate 36 of the friction drive 16 spin with the axle 14. The O-ring 38 on the cylindrical plate 36 engages and spins the spool 42 which rotates the shaft 44 and, in turn, rotates the decorative figures 18, 52, 62. The decorative figures 18, 52, 62 may rotate about a rotational axis 17, 54 substantially perpendicular and substantially parallel, respectively, to the rotational axis 20 of the axle 14. The rotation of the decorative figures 18, 52, 62 enhances the aesthetic appearance of the wheel 12 and the vehicle associated therewith.

While the invention has been described in connection with what is presently considered to be the most practical and preferred embodiment, it is to be understood that the invention is not to be limited to those disclosed embodiments, but on the contrary, it is intended to cover various modifications and equivalent arrangements included within the spirit and scope of the appended claims which scope is to be accorded the broadest interpretation so as to encompass all such modifications and equivalent structures as is permitted under the law.

What is claimed:

1. A decorative wheel apparatus for enhancing the aesthetic appearance of a rotatable wheel having an axle with a rotational axis, comprising:
    a friction drive engageable with and driven by said axle of said wheel about said rotational axis;
    a shaft having a rotational axis substantially perpendicular to said rotational axis of said axle, the shaft supportable by said wheel and rotatably driven by said friction drive about said shaft's rotational axis; and
    at least one first decorative figure coupled to said shaft, wherein said shaft rotates said at least one first decorative figure to enhance the aesthetic appearance of said wheel.

2. The decorative wheel apparatus stated in claim 1, further comprising:
    said at least one first decorative figure having a rotational axis substantially parallel to said rotational axis of said axle.

3. A decorative wheel apparatus for enhancing the aesthetic appearance of a rotatable wheel having an axle with a rotational axis, comprising:
    a friction drive engageable with and driven by said axle of said wheel about said rotational axis;
    a shaft supportable by said wheel and rotatable driven by said friction drive;
    at least one first decorative figure coupled to said shaft, wherein said shaft rotates said at least one first decorative figure to enhance the aesthetic appearance of said wheel; and
    said at least one first decorative figure having a rotational axis substantially perpendicular to said rotational axis of said axle.

4. A decorative wheel apparatus for enhancing the aesthetic appearance of a rotatable wheel having an axle with a rotational axis, comprising:
    a friction drive engageable with and driven by said axle of said wheel about said rotational axis;
    a shaft supportable by said wheel and rotatable driven by said friction drive;
    at least one first decorative figure coupled to said shaft, wherein said shaft rotates said at least one first decorative figure to enhance the aesthetic appearance of said wheel;
    a floating spring adaptable to rotate with said axle about said rotational axis of said axle;
    a substantially cylindrical plate coupled to and spring biased by said floating spring; and
    an O-ring disposed within a recess in said cylindrical plate and biased against said shaft for engaging and rotating said shaft.

5. The decorative wheel apparatus stated in claim 4, said shaft further comprising:
    a spool connected to said shaft, and said O-ring engaging and rotating said spool and said shaft about a rotational axis substantially perpendicular to said rotational axis of said axle.

6. A decorative wheel apparatus for enhancing the aesthetic appearance of a rotatable wheel having an axle with a rotational axis, comprising:
    a friction drive engageable with and driven by said axle of said wheel about said rotational axis;
    a shaft supportable by said wheel and rotatably driven by said friction drive;
    at least one first decorative figure coupled to said shaft, wherein said shaft rotates said at least one first decorative figure to enhance the aesthetic appearance of said wheel; and
    at least one second decorative figure connected to said shaft and rotating about an axis substantially perpendicular to said rotational axis of said axle.

7. A decorative wheel apparatus for enhancing the aesthetic appearance of a rotatable wheel having an axle with a rotational axis, comprising:
    a friction drive engageable with and driven by said axle of said wheel about said rotational axis;
    a shaft supportable by said wheel and rotatable driven by said friction drive;
    at least one first decorative figure coupled to said shaft, wherein said shaft rotates said at least one first decorative figure to enhance the aesthetic appearance of said wheel;
    at least one bearing coupled to said shaft for rotatably supporting said shaft; and
    at least one bearing retainer connected to said at least one bearing and connectable to said wheel.

8. A decorative wheel apparatus for enhancing the aesthetic appearance of a rotatable wheel having an axle with a rotational axis, comprising:
    a friction drive engageable with and driven by said axle of said wheel about said rotational axis;
    a shaft supportable by said wheel and rotatably driven by said friction drive;
    at least one first decorative figure coupled to said shaft, wherein said shaft rotates said at least one first decorative figure to enhance the aesthetic appearance of said wheel;
    said at least one first decorative figure having a rotational axis substantially parallel to said rotational axis of said axle;
    said at least one first decorative figure rotatably connectable to said wheel;
    at least one O-ring disposed within a recess in an inner periphery of said at least one first decorative figure; and
    a spool connected to said shaft, and said spool engaging and driving said at least one O-ring to rotate said at least one first decorative figure in response to the rotation of said axle.

9. A decorative wheel apparatus for enhancing the aesthetic appearance of a rotatable wheel having an axle with a rotational axis, comprising:
    a friction drive engageable with and rotatably driven by said axle about said rotational axis, and said friction drive having a floating spring for biasing a substantially cylindrical plate having an O-ring disposed therein;
    a shaft supportable by said wheel;
    a spool connected to said shaft, and said O-ring of said cylindrical plate biased against said spool by said floating spring to engage and rotatably drive said spool and said shaft by said friction drive; and
    at least one first decorative figure coupled to said shaft, and said shaft rotating said at least one first decorative figure to enhance the aesthetic appearance of said wheel.

10. The decorative wheel apparatus stated in claim 9, wherein said first decorative figure further comprises:
    said at least one disc having a rotational axis substantially perpendicular to said rotational axis of said axle.

11. The decorative wheel apparatus stated in claim 9, wherein said first decorative figure further comprises:
    said at least one disc having a rotational axis substantially parallel to said rotational axis of said axle.

12. The decorative wheel apparatus stated in claim 11, further comprising:
    said at least one disc rotatably connectable to said wheel;
    at least one O-ring disposed within a recess provided in an inner periphery of said at least one disc; and
    a second spool connected to said shaft, and said second spool engaging and driving said at least one O-ring in said at least one disc to rotate said at least one disc in response to the rotation of said axle.

13. The decorative wheel apparatus stated in claim 9, further comprising:
    at least one second decorative figure connected to said shaft and rotating about an axis substantially perpendicular to said rotational axis of said axle.

14. The decorative wheel apparatus stated in claim 9, further comprising:
    at least one bearing coupled to said shaft for rotatably supporting said shaft; and
    at least one bearing retainer connected to said bearing and connectable to said wheel.

15. A decorative wheel apparatus for enhancing the aesthetic appearance of a rotatable wheel having an axle with a rotational axis, comprising:
    a friction drive engageable with said axle for rotating said friction drive about said rotational axis of said axle, and said friction drive having a floating spring engaging and biasing a substantially cylindrical plate having an O-ring disposed in a recess therein;
    a shaft rotatably connectable to said wheel by at least one bearing coupled to said shaft, and said at least one bearing retainer connected to said bearing and connectable to said wheel;
    a substantially-cylindrical first spool connected to said shaft, and said spool engaged and rotatably driven by said O-ring of said friction drive for rotating said spool and said shaft; and
    at least one substantially circular disc coupled to said shaft, and said shaft rotating said at least one disc for enhancing the aesthetic appearance of said wheel.

16. The decorative wheel apparatus stated in claim 15, further comprising:
    said at least one disc having a rotational axis substantially perpendicular to said rotational axis of said axle.

17. The decorative wheel apparatus stated in claim 16, further comprising:
    at least one decorative figure connected to said shaft and rotating about an axis substantially perpendicular to said rotational axis of said axle.

18. The decorative wheel apparatus stated in claim 15, further comprising:
    said at least one disc having a rotational axis substantially parallel to said rotational axis of said axle.

19. The decorative wheel apparatus stated in claim 18, further comprising:
    said at least one disc rotatably connectable to said wheel;
    a bearing connectable to said wheel and coupled to said at least one disc for rotatably supporting said at least one disc;
    at least one O-ring disposed within a recess formed in an inner periphery of said at least one disc; and
    a second spool connected to said shaft, and said second spool engaging and driving said at least one O-ring to rotate said shaft and said at least one disc in response to the rotation of said axle.

20. The decorative wheel apparatus stated in claim 15, further comprising:
    a plurality of shafts connectable to said wheel, and each of said shafts having at least one bearing and bearing retainer to support the rotation of said shafts;
    each of said shafts having a first spool connected thereto, and said spool engaged and rotatably driven by said O-ring of said friction drive for rotating said spool of said shaft; and
    said at least one disc coupled to each of said shafts, and said shafts rotating said at least one disc for enhancing the aesthetic appearance of said wheel.

* * * * *

UNITED STATES PATENT AND TRADEMARK OFFICE
CERTIFICATE OF CORRECTION

PATENT NO. : 7,314,254 B1 Page 1 of 1
APPLICATION NO. : 11/050630
DATED : January 1, 2008
INVENTOR(S) : Salow It is certified that error appears in the above-identified patent and that said Letters Patent is hereby corrected as shown below:

1. In Column 4, line 42, please delete "figure" and insert -- figures --;

2. In Column 4, line 44, please delete "figure" and insert -- figures --;

3. In Column 4, line 45, please delete "figure" and insert -- figures --; and

4. In Column 4, line 47, please delete "figure" and insert -- figures --.

Signed and Sealed this

Twentieth Day of May, 2008

JON W. DUDAS
*Director of the United States Patent and Trademark Office*